(12) United States Patent
Liegard et al.

(10) Patent No.: US 11,640,414 B2
(45) Date of Patent: May 2, 2023

(54) GENERATING WORKFLOW, REPORT, INTERFACE, CONVERSION, ENHANCEMENT, AND FORMS (WRICEF) OBJECTS FOR ENTERPRISE SOFTWARE

(71) Applicant: Accenture Global Solutions Limited, Dublin (IE)

(72) Inventors: Michel-Etienne Liegard, Le Kremlin Bicêtre (FR); Aymeric Piganeau, Paris (FR); Stephanie Guimbellot, Paris (FR)

(73) Assignee: Accenture Global Solutions Limited, Dublin (IE)

( * ) Notice: Subject to any disclaimer, the term of this patent is extended or adjusted under 35 U.S.C. 154(b) by 88 days.

(21) Appl. No.: 17/103,164

(22) Filed: Nov. 24, 2020

(65) Prior Publication Data
US 2022/0083573 A1  Mar. 17, 2022

(30) Foreign Application Priority Data
Sep. 17, 2020 (EP) .................................... 20290064

(51) Int. Cl.
*G06F 16/28* (2019.01)
*G06F 16/22* (2019.01)

(52) U.S. Cl.
CPC ........ *G06F 16/289* (2019.01); *G06F 16/2282* (2019.01)

(58) Field of Classification Search
CPC ........................... G06F 16/289; G06F 16/2282
See application file for complete search history.

(56) References Cited

U.S. PATENT DOCUMENTS 7,325,015 B2 * 1/2008 Zhou ..................... G06Q 10/06
7,412,457 B2 * 8/2008 Saracco ................ G06F 16/256
7,644,390 B2   1/2010 Khodabandehloo et al.
(Continued)

FOREIGN PATENT DOCUMENTS

EP   3553714 A1   10/2019
EP   3637264 A1    4/2020
JP   2019207687 A  12/2019

OTHER PUBLICATIONS

Extended European Search Report for Application No. EP21166517.9, dated Oct. 13, 2021, 12 pages.

*Primary Examiner* — Miranda Le
(74) *Attorney, Agent, or Firm* — Harrity & Harrity, LLP

(57) ABSTRACT

In some implementations, a device may receive user request data from a user device associated with a user. The device may retrieve pre-defined technical object content data from an enterprise system. The device may retrieve pre-defined interface format data and a pre-defined business rule from a first data structure and a second data structure, respectively, based on the user request data. The device may determine whether a mapping, for generating an enterprise system object, is stored in a third data structure. The device may map the technical object content data to the pre-defined interface format data, based on the mapping and the pre-defined business rule, to generate mapped data when the mapping is stored in a third data structure. The device may generate the enterprise system object based on the mapped data. The device may perform one or more actions based on the enterprise system object.

20 Claims, 9 Drawing Sheets

(56) References Cited

U.S. PATENT DOCUMENTS

| | | | | |
|---|---|---|---|---|
| 7,971,180 B2* | 6/2011 | Kreamer | ................ | G06Q 10/06 |
| | | | | 717/102 |
| 8,032,404 B2* | 10/2011 | Lee | ................ | G06Q 10/063118 |
| | | | | 705/7.17 |
| 8,135,716 B2* | 3/2012 | Stork | ................. | G06F 16/2448 |
| | | | | 707/740 |
| 8,234,570 B2* | 7/2012 | Ananthanarayanan | ... | G06F 8/36 |
| | | | | 715/204 |
| 2004/0128644 A1* | 7/2004 | Hurst | ................ | G06F 9/465 |
| | | | | 717/100 |
| 2005/0165829 A1* | 7/2005 | Varasano | ................ | G06Q 30/00 |
| | | | | 707/999.102 |
| 2008/0312980 A1* | 12/2008 | Boulineau | ................ | G06Q 10/06 |
| | | | | 705/7.13 |
| 2011/0083120 A1* | 4/2011 | Bhandar | ................ | G06Q 10/067 |
| | | | | 717/121 |
| 2011/0167070 A1* | 7/2011 | Ananthanarayanan | ................ | |
| | | | | G06Q 10/10 |
| | | | | 707/765 |
| 2012/0226516 A1* | 9/2012 | Ahern | ................ | G06Q 10/0639 |
| | | | | 705/7.22 |
| 2015/0302303 A1* | 10/2015 | Hakim | ................ | G06Q 10/063 |
| | | | | 706/11 |
| 2015/0317129 A1* | 11/2015 | Falk | ................ | G06F 8/315 |
| | | | | 717/106 |
| 2018/0082228 A1 | 3/2018 | Pandey et al. | | |
| 2018/0121841 A1* | 5/2018 | Harris | ................ | G06Q 10/067 |
| 2020/0012582 A1 | 1/2020 | Sharma | | |

\* cited by examiner

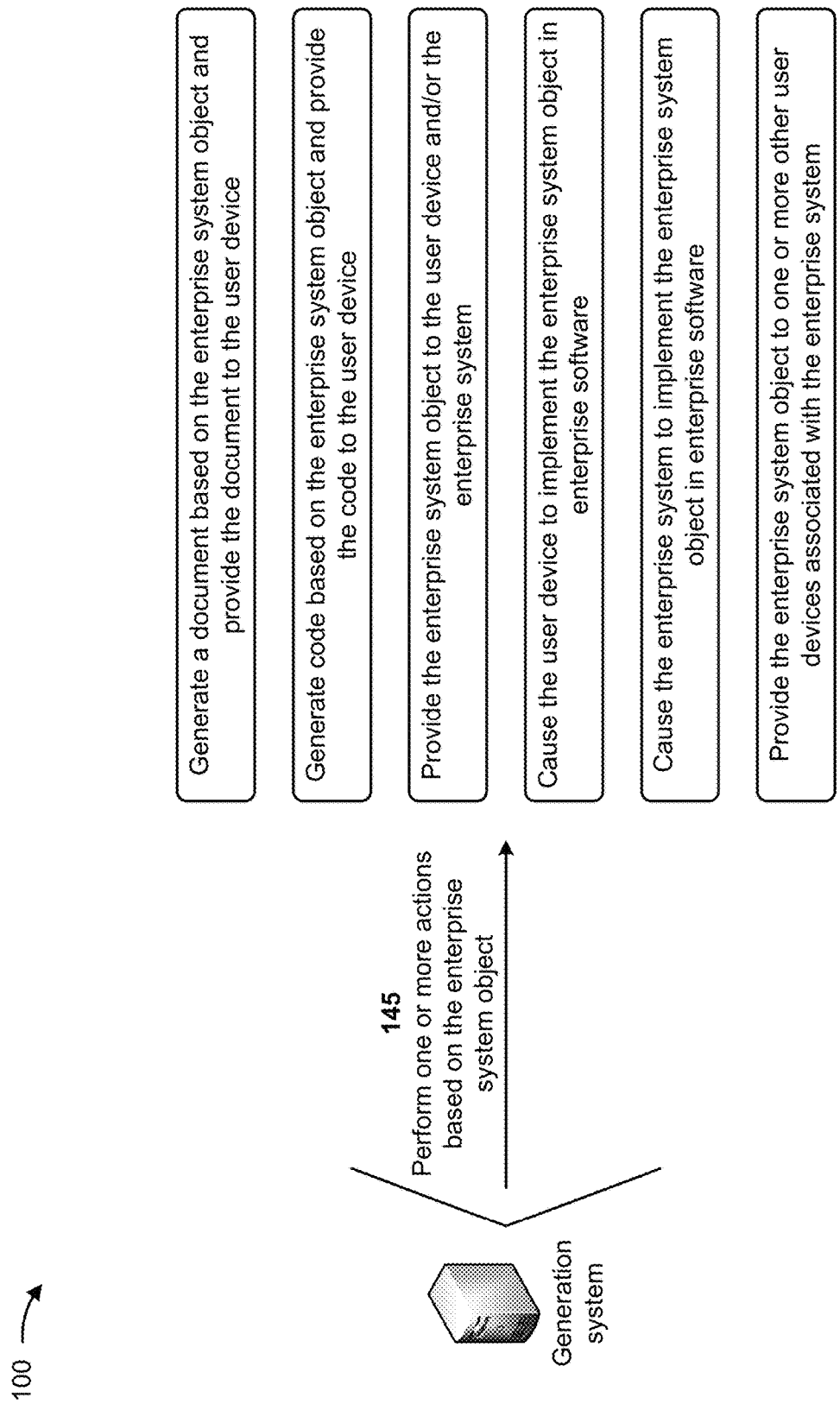

US 11,640,414 B2

GENERATING WORKFLOW, REPORT, INTERFACE, CONVERSION, ENHANCEMENT, AND FORMS (WRICEF) OBJECTS FOR ENTERPRISE SOFTWARE

CROSS-REFERENCE TO RELATED APPLICATION

This Patent Application claims priority to European Patent Application No. 20290064.3, filed on Sep. 17, 2020, and entitled "GENERATING WORKFLOW, REPORT, INTERFACE, CONVERSION, ENHANCEMENT, AND FORMS (WRICEF) OBJECTS FOR ENTERPRISE SOFTWARE." The disclosure of the prior Application is considered part of and is incorporated by reference into this Patent Application.

BACKGROUND

Enterprise software is computer software used to satisfy needs of an organization rather than individual users. Such organizations may include businesses, schools, interest-based user groups, clubs, charities, and governments. Enterprise software is an integral part of a computer-based information system, and a collection of such software is called an enterprise system.

SUMMARY

In some implementations, a method includes receiving, by a device, user request data from a user device associated with a user; retrieving, by the device, pre-defined technical object content data from an enterprise system based on the user request data; retrieving, by the device, pre-defined interface format data from a first data structure based on the user request data; retrieving, by the device, a pre-defined business rule from a second data structure based on the user request data; determining, by the device, whether a mapping, for generating an enterprise system object, is stored in a third data structure; mapping, by the device, the technical object content data to the pre-defined interface format data, based on the mapping and the pre-defined business rule, to generate mapped data when the mapping, for generating the enterprise system object, is stored in the third data structure; generating, by the device, the enterprise system object based on the mapped data; and performing, by the device, one or more actions based on the enterprise system object.

In some implementations, a device includes one or more memories; and one or more processors, communicatively coupled to the one or more memories, configured to: receive user request data from a user device associated with a user; receive pre-defined technical object content data from an enterprise system; retrieve pre-defined interface format data from a first data structure based on the user request data; retrieve a pre-defined business rule from a second data structure based on the user request data; determine whether a mapping, for generating an enterprise system object, is stored in a third data structure; selectively: map the technical object content data to the pre-defined interface format data, based on the mapping and the pre-defined business rule to generate mapped data and generate the enterprise system object based on the mapped data when the mapping, for generating the enterprise system object, is stored in the third data structure, or generate the enterprise system object based on creation data received from the user device when the mapping, for generating the enterprise system object, is not stored in the third data structure; and perform one or more actions based on the enterprise system object.

In some implementations, a non-transitory computer-readable medium storing a set of instructions includes one or more instructions that, when executed by one or more processors of a device, cause the device to: receive user request data from a user device associated with a user; receive pre-defined technical object content data from an enterprise system; retrieve pre-defined interface format data from a first data structure based on the user request data; retrieve a pre-defined business rule from a second data structure based on the user request data; determine whether a mapping, for generating an enterprise system object, is stored in a third data structure; map the technical object content data to the pre-defined interface format data, based on the mapping and the pre-defined business rule, to generate mapped data when the mapping is stored in the third data structure; receive creation data from the user device when the mapping is not stored in the third data structure; generate the enterprise system object based on the creation data; and perform one or more actions based on the enterprise system object.

BRIEF DESCRIPTION OF THE DRAWINGS

FIGS. 1A-1F are diagrams of an example implementation described herein.

DETAILED DESCRIPTION

Figure 1A:
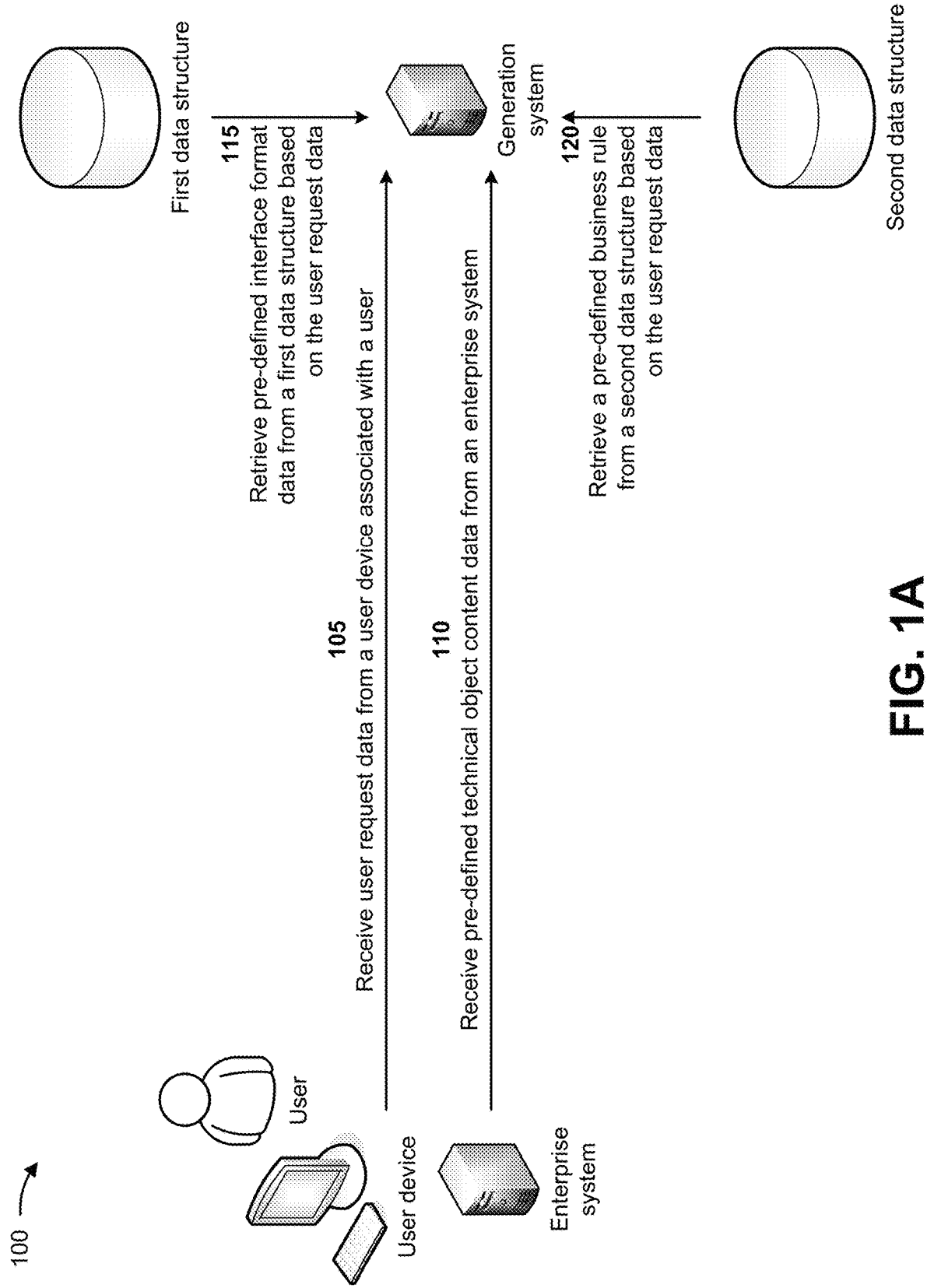

The following detailed description of example implementations refers to the accompanying drawings. The same reference numbers in different drawings may identify the same or similar elements.

Services provided by enterprise software are typically business-oriented tools, such as online shopping, online payment processing, interactive product catalogues, automated billing systems, security, business process management, enterprise content management, information technology service management, customer relationship management, enterprise resource planning, business intelligence, project management, collaboration, human resource management, manufacturing, occupational health and safety, enterprise application integration, and enterprise forms automation. Enterprise software may utilize enterprise system objects, such as workflow, report, interface, conversion, enhancement, and forms (WRICEF) objects. An enterprise object may include any type of custom development or enhancement for the enterprise software. An enterprise object may include configuration units that group all configuration, development, and documentation that belongs to an enhancement. However, current methods for generating enterprise objects are time consuming, manpower intensive, and generate customized enterprise objects that cannot be shared and/or continuously tested. Thus, current methods for generating enterprise objects waste human resources, computing resources (e.g., processing resources, memory resources, communication resources, and/or the like), networking resources, and/or the like associated with manually generating enterprise objects, generating enterprise objects that cannot be shared, generating enterprise objects that do not scale, and/or the like.

Some implementations described herein relate to a generation system that generates WRICEF objects for enterprise software. For example, the generation system may receive user request data and may receive pre-defined technical object content data (e.g., data associating a field business partner in a table) from a library. The generation system may retrieve a predefined interface format data from a first database based on the user request data and may retrieve a predefined business rule from a second database. The generation system may map the technical object content data to the predefined interface format data based on the predefined business rule and may generate an enterprise object based on the mapped technical object content data and the predefined interface format data. If there is no existing mapping, the generation system may receive creation data from a user and may generate the enterprise object based on the creation data. The generation system may generate a document (e.g., a technical document) based on the enterprise object and may generate code based on the enterprise object.

In this way, the generation system may quickly and automatically generate enterprise objects for enterprise software. For example, the generation system may map the technical object content data with the predefined interface format data based on the predefined business rule and may generate an enterprise object based on the mapped technical object content data and the predefined interface format data. Thus, the generation system conserves human resources, computing resources, networking resources, and/or the like that would otherwise have been wasted by manually generating enterprise objects, generating enterprise objects that cannot be shared, generating enterprise objects that do not scale, and/or the like.

FIGS. 1A-1F are diagrams of an example 100 associated with generating enterprise system objects (e.g., WRICEF objects) for enterprise software. As shown in FIGS. 1A-1F, example 100 includes a user device and an enterprise system associated with a user and a generation system. The user device may include a laptop computer, a mobile telephone, a desktop computer, and/or the like utilized by the user. The enterprise system may include a device that collects and/or determines pre-defined technical object content data. The generation system may include a system that generates enterprise system objects for enterprise software, as described herein.

As shown in FIG. 1A, and by reference number 105, the generation system receives user request data from a user device associated with a user. The user request data may include information associated with generating an enterprise system object for enterprise software. In some implementations, the enterprise system object includes a WRICEF object. In some implementations, the enterprise system object includes a custom enhancement for enterprise software and configuration units. The configuration units may group configuration data, development data, and documentation associated with the custom enhancement.

Alternatively, and/or additionally, the enterprise system object may include a report for enterprise software, an outbound user interface for the enterprise software, an inbound user interface for the enterprise software, a conversion user interface for the enterprise software, an enhancement to a standard user interface for the enterprise software, an enhancement to a new user interface application for the enterprise software, a business intelligence transformation process for the enterprise software, a form for the enterprise software, a workflow for the enterprise software, and/or the like. The above-listed enterprise system objects are intended to be merely examples of types of enterprise system objects that may be used. In practice, the enterprise system object may include any one or more of the above-listed enterprise system objects and/or one or more other types of enterprise system objects not listed above.

The user request data may include information identifying a name of the enterprise system object, a description of the enterprise system object (e.g., read sales orders, call web service, import data to web service, export data to web server, and/or the like), a type of the enterprise system object (e.g., workflow, report, interface, conversion, enhancement, and/or form), and/or the like. In some implementations, the user request data may include information identifying a technical object associated with the enterprise system object. The technical object may include a function module comprising a sub-program for performing a function. The sub-program may include a set of reusable statements with importing parameters and/or exporting parameters. The enterprise system object may call the technical object to execute the sub-program to cause the function to be performed. As an example, the technical object may be a read sales orders technical object that can be called to read sales orders from a data structure.

In some implementations, the user request data includes a recording of activities performed by the user with the user device. The user may select, via a user interface associated with the generation system, an option to record activities of the user with the user device. The user may perform a series of actions via the user interface. For example, the user may cause a particular screen to be displayed, may insert data into a field of the particular screen, may add or remove a field from the particular screen, may reformat data contained in a particular field, and/or the like. The user device may generate a recording of the series of actions performed by the user. For example, the user device may generate a log record that includes information identifying the particular screen, the series of actions performed by the user, an order in which the series of actions were performed, and/or the like.

As shown by reference number 110, the generation system receives pre-defined technical object content data from an enterprise system. The generation system may determine a technical object associated with the enterprise system object based on the user request data. In some implementations, the user request data includes information identifying the technical object and the generation system determines the technical object associated with the enterprise system object based on the information identifying the technical object. In some implementations, the generation system determines a technical object associated with obtaining data (e.g., from a data structure stored in a memory of the enterprise system) and a technical object associated with providing data (e.g., to a third-party web service).

Alternatively, and/or additionally, the generation system determines the technical object based on the description of the enterprise system object included in the user request data. The generation system may utilize one or more natural language processing (NLP) techniques to process the description of the enterprise system object included in the user request data. The generation system may determine the technical object associated with the enterprise system object based on processing the description of the enterprise system object.

The generation system may request the technical object from the enterprise system. The enterprise system may receive the request from the generation system. The enterprise system may provide technical object content data associated with the technical object to the generation system based on the request. In some implementations, the technical object content data includes information associated with data obtained by the function associated with the technical object. For example, the technical object content data may include information identifying a field of a data structure from which data is obtained, information identifying a field of a data structure to which data is to be stored, and/or the like.

As shown by reference number 115, the generation system retrieves pre-defined interface format data from a first data structure based on the user request data. The interface format data may include information indicating how a service (e.g., a service for obtaining data from the enterprise system, a service for providing data to a web service, and/or the like) can be called, a parameter utilized by the service, a data structure returned by the service, a format of data exported to the service, a format of data imported from the service, a function provided by the service, and/or the like. For example, the interface format data may include a web services description language (WSDL) file, an intermediate document (Idoc), and/or the like. The service may be an internal service provided by the generation system and/or an external service (e.g., a WSDL web service) provided by another device.

The generation system may determine the interface format associated with the enterprise system object based on the user request data. For example, the generation system may determine a service associated with the enterprise system object based on the description of the enterprise system object and/or information indicating the technical object included in the user request data. The generation system may obtain the interface format associated with the service from the first data structure based on the service being associated with the enterprise system object.

As shown by reference number 120, the generation system retrieves a pre-defined business rule from a second data structure based on the user request data. The business rule may be associated with modifying data obtained by the generation system. For example, the business rule may be a rule associated with converting data from a first format to a second format, a rule associated with combining (e.g., adding, subtracting, multiplying, dividing, merging, and/or the like) data in a first field of a table with data in a second field of a table, and/or the like.

In some implementations, the business rule may be identified in the user request data. Alternatively, and/or additionally, the generation system may determine the business rule based on the technical object associated with the enterprise system object. As an example, the technical object may be associated with retrieving data from a data structure stored in a memory of the enterprise system and providing the data to an external source (e.g., a third-party web service). The generation system may identify a business rule associated with the technical object (e.g., a business rule associated with converting the data from a first format to a second format) based on accessing a data structure storing information mapping technical objects to associated business rules. The generation system may obtain the business rule from the second data structure based on the business rule being associated with the technical object.

Figure 1B:
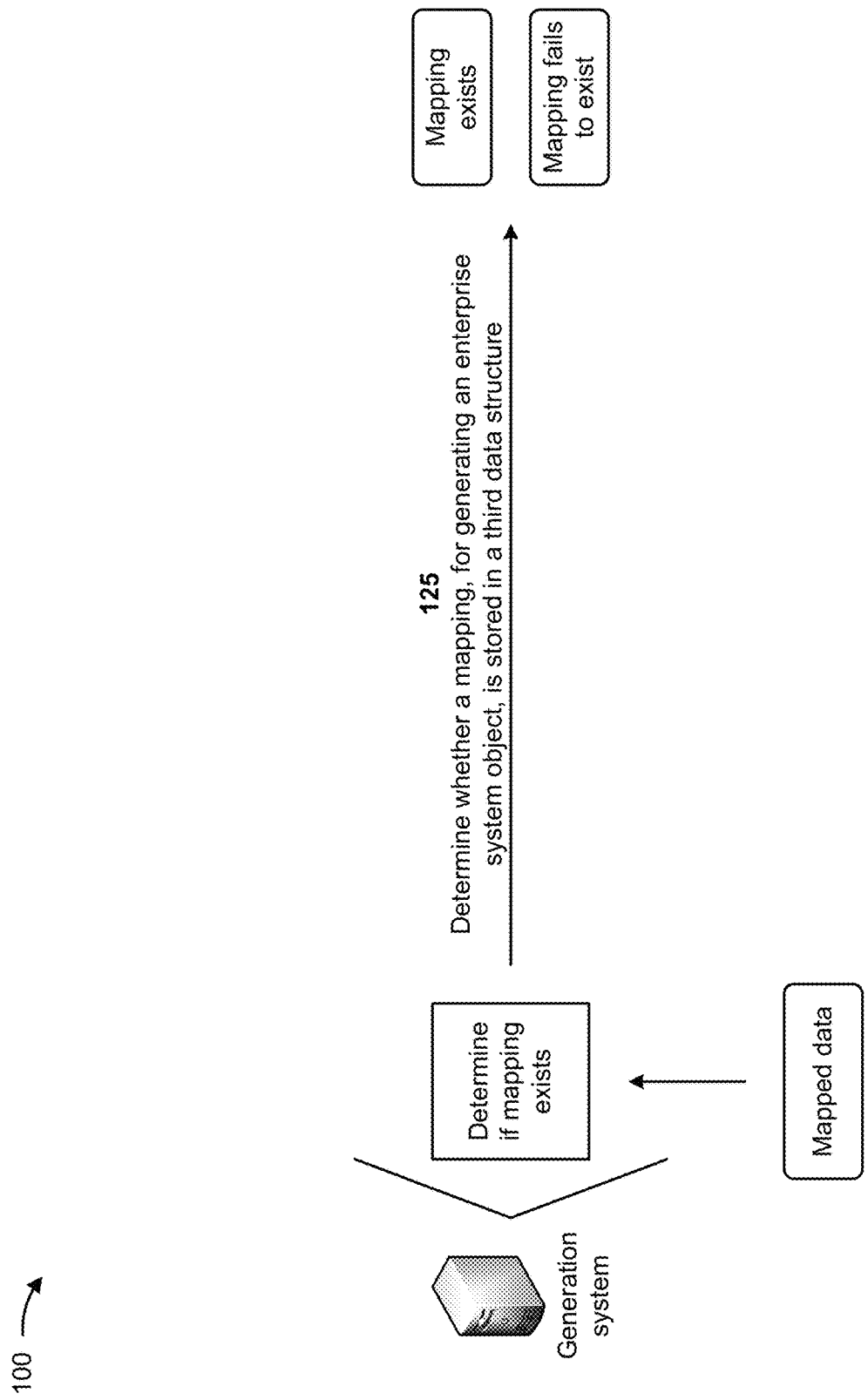

As shown in FIG. 1B, and by reference number 125, the generation system determines whether a mapping, for generating an enterprise system object, is stored in a third data structure. The mapping may include information associating data fields associated with the technical object and data fields associated with the pre-defined interface format data. As an example, the technical object may be associated with a function for obtaining a first field of data (e.g., sales data) from the enterprise system and exporting the first field of data to a web service. The pre-defined interface format data may include information identifying a second field of data associated with sales data. The mapping may include information mapping first field of data to the second field of data.

The third data structure may store information associating mappings with technical objects and/or pre-defined interface format data. The generation system may access the third data structure and may determine whether the mapping is stored in the data structure based on the technical object and/or the pre-defined interface format data associated with the enterprise system object.

Figure 1C:
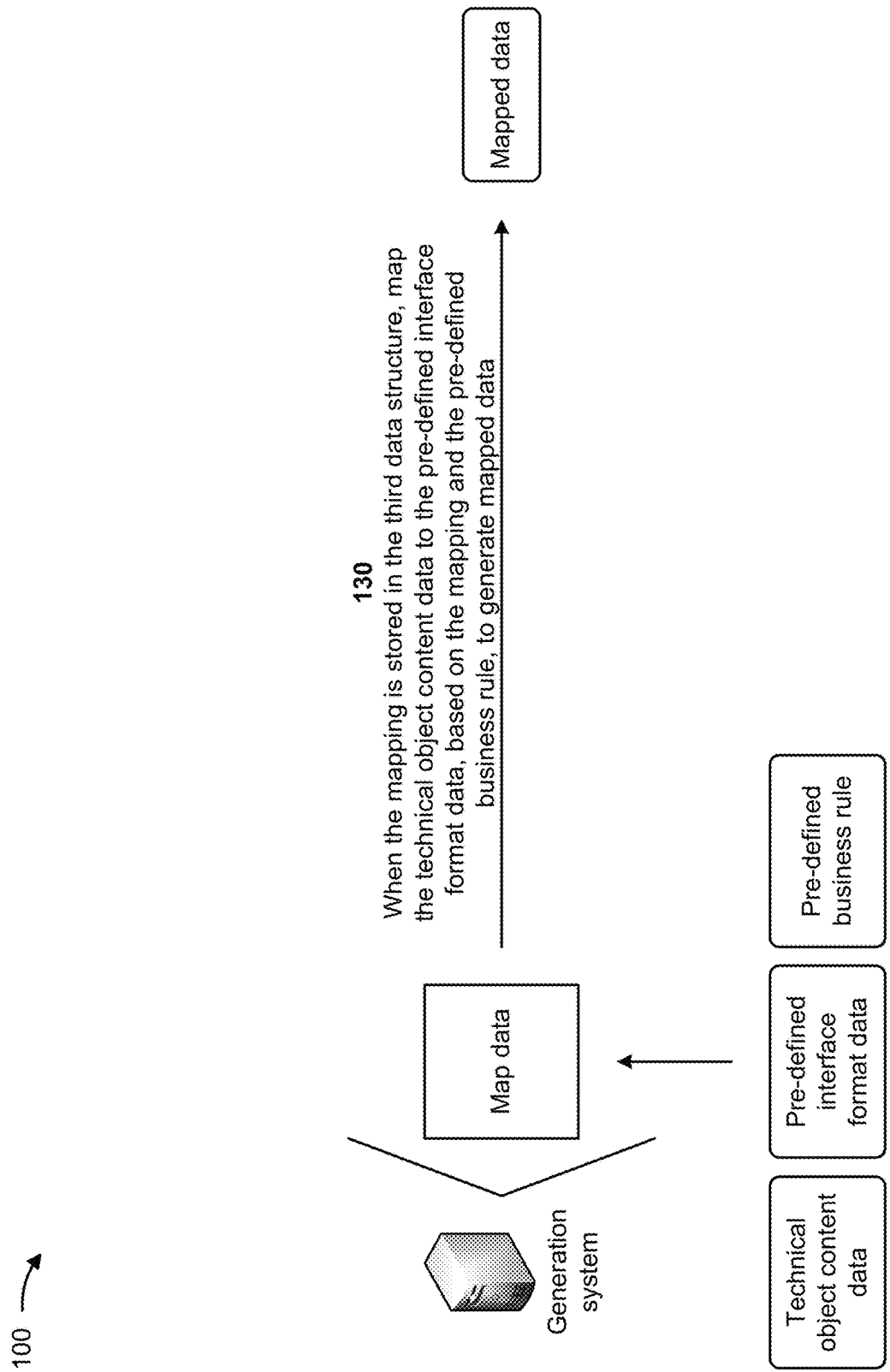
Figure 1D:
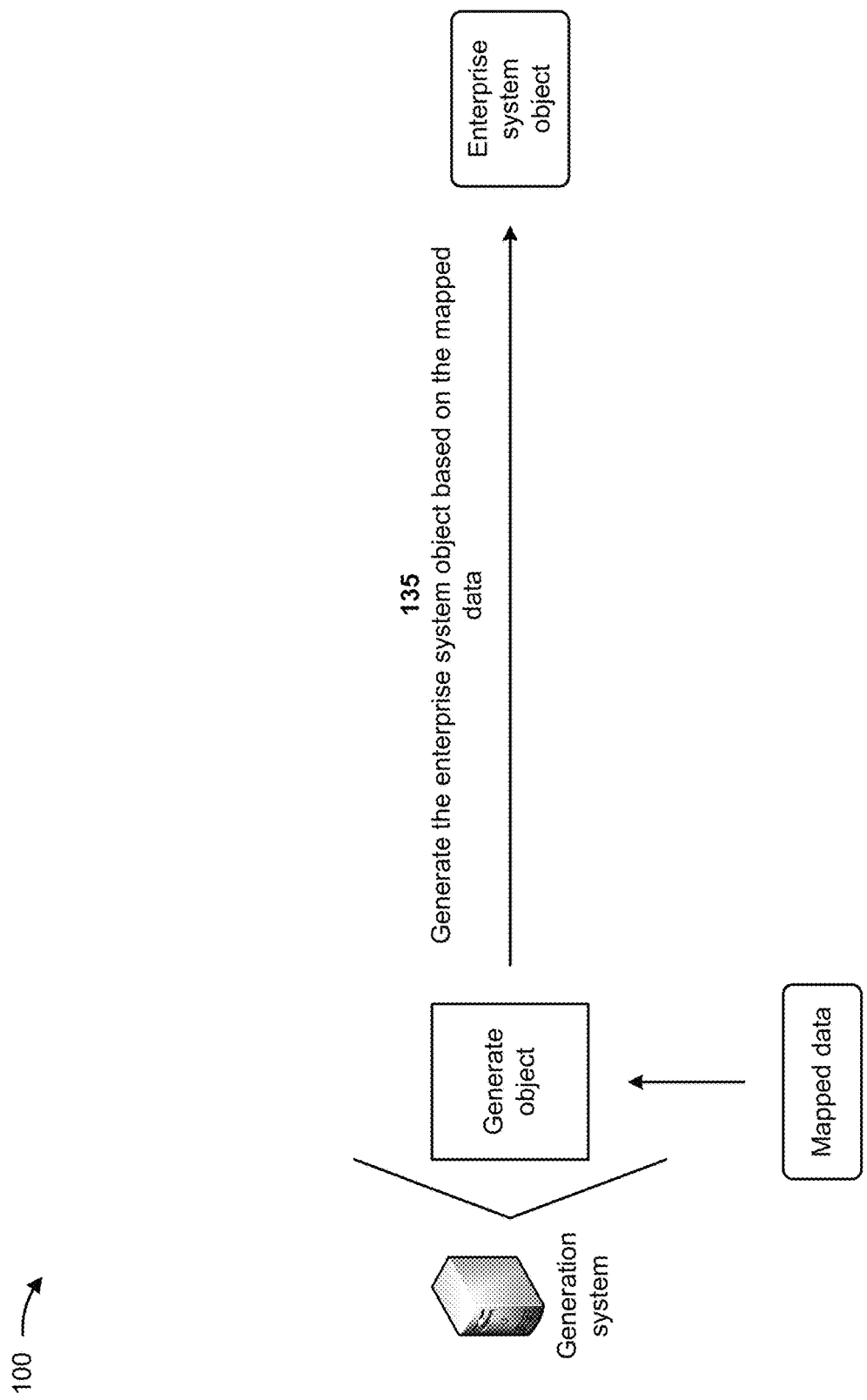

In some implementations, the mapping is stored in the third data structure. As shown in FIG. 1C, and by reference number 130, the generation system maps the technical object content data to the pre-defined interface format data, based on the mapping and the pre-defined business rule, to generate mapped data when the mapping is stored in the third data structure. The mapped data may associate a field associated with the technical object with a field associated with the pre-defined interface format data based on the mapping. The generation system may associate a business rule (e.g., a rule associated with converting data stored in the field associated with the technical object from a first format to a second format) with the field associated with the technical object and/or the field associated with the pre-defined interface format data based on the pre-defined business rule. As shown in FIG. 1D, and by reference number 135, the generation system generates the enterprise system object based on the mapped data.

Figure 1E:
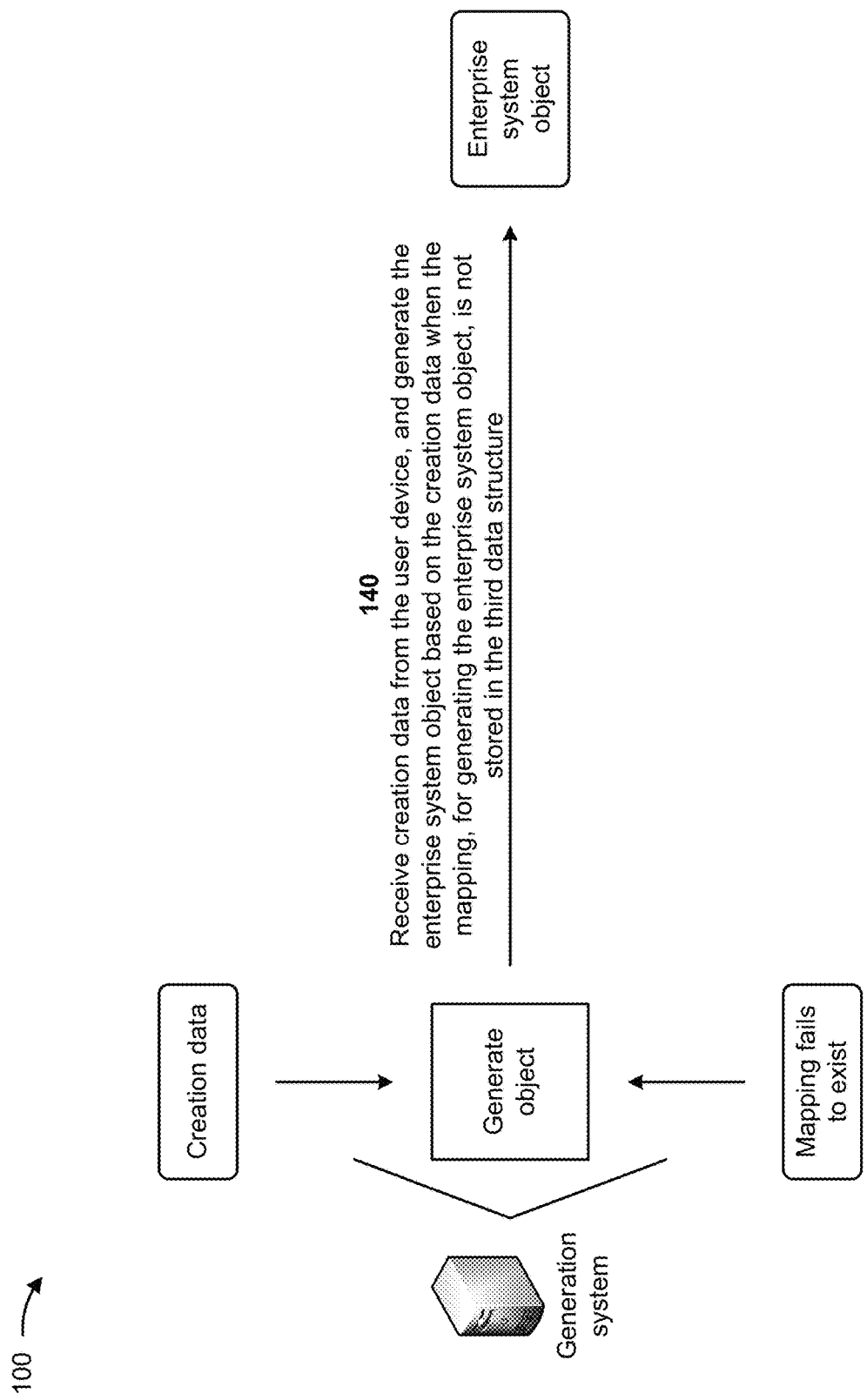

As shown in FIG. 1E, and by reference number 140, the generation system receives creation data from the user device and generates the enterprise system object based on the creation data when the mapping, for the enterprise system object, is not stored in the third data structure. The creation data may include mapping data generated by the user. For example, the user may utilize a wireframe tool to draw screens and forms. The creation data may include information identifying the screens and forms and mapping data mapping the field of data associated with the technical object to a field of a form drawn by the user with the wireframe tool. The user may cause the user device to provide the creation data to the generation system. The generation system may generate the enterprise system object based on the creation data.

As shown in FIG. 1F, and by reference number 145, the generation system may perform one or more actions based on the enterprise system object. In some implementations, the one or more actions include the generation system generating a document based on the enterprise system object and providing the document to the user device. The generation system may identify information (e.g., a document created based on executing the enterprise system object, a technical document, a reference document, a version control document, and/or the like) associated with the enterprise system object based on the technical object, the pre-defined interface format, and/or the user request data (e.g., a document identified in the user request data). The generation system may generate a document associated with the enterprise system object based on the identified information. In this way, the generation system may provide document control documents, reference documents, technical documents, and/or the like to the user.

In some implementations, the one or more actions include the generation system generating code based on the enterprise system object and providing the code to the user device. The generation system may generate executable code for the enterprise system object and may provide the executable code to the user via the user device.

In some implementations, the one or more actions include the generation system providing the enterprise system object to the user device, the enterprise system, and/or one or more other user devices. For example, the generation system may provide the enterprise system object to the user device, the enterprise system, and/or one or more other user devices based on generating the enterprise system object. In this way, the generation system may generate a portable enterprise system object that can be shared among a plurality of different users.

In some implementations, the one or more actions include the generation system causing the user device to implement the enterprise system object in enterprise software. The generation system may provide the enterprise system object to the user device to cause the user device to implement the enterprise system object in the enterprise software. Implementing the enterprise system object in the enterprise software may cause a function associated with the enterprise system object to be performed. For example, implementing the enterprise system object in the enterprise software may cause sales data to be obtained from the enterprise system and provided to a third-party web service, may cause a report to be generated, may cause data to be converted from a first format to a second format, may cause a workflow to be executed, and/or the like. Alternatively, and/or additionally, the one or more actions may include the generation system providing the enterprise system object to the enterprise system and/or causing the enterprise system to implement the enterprise system object in the enterprise software.

In this way, the generation system may quickly and automatically generate enterprise system objects for enterprise software. For example, the generation system may map the technical object content data with the predefined interface format data based on the predefined business rule and may generate an enterprise object based on the mapped technical object content data and the predefined interface format data. Thus, the generation system conserves human resources, computing resources, networking resources, and/or the like that would otherwise have been wasted by manually generating enterprise system objects, generating enterprise system objects that cannot be shared, generating enterprise system objects that do not scale, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
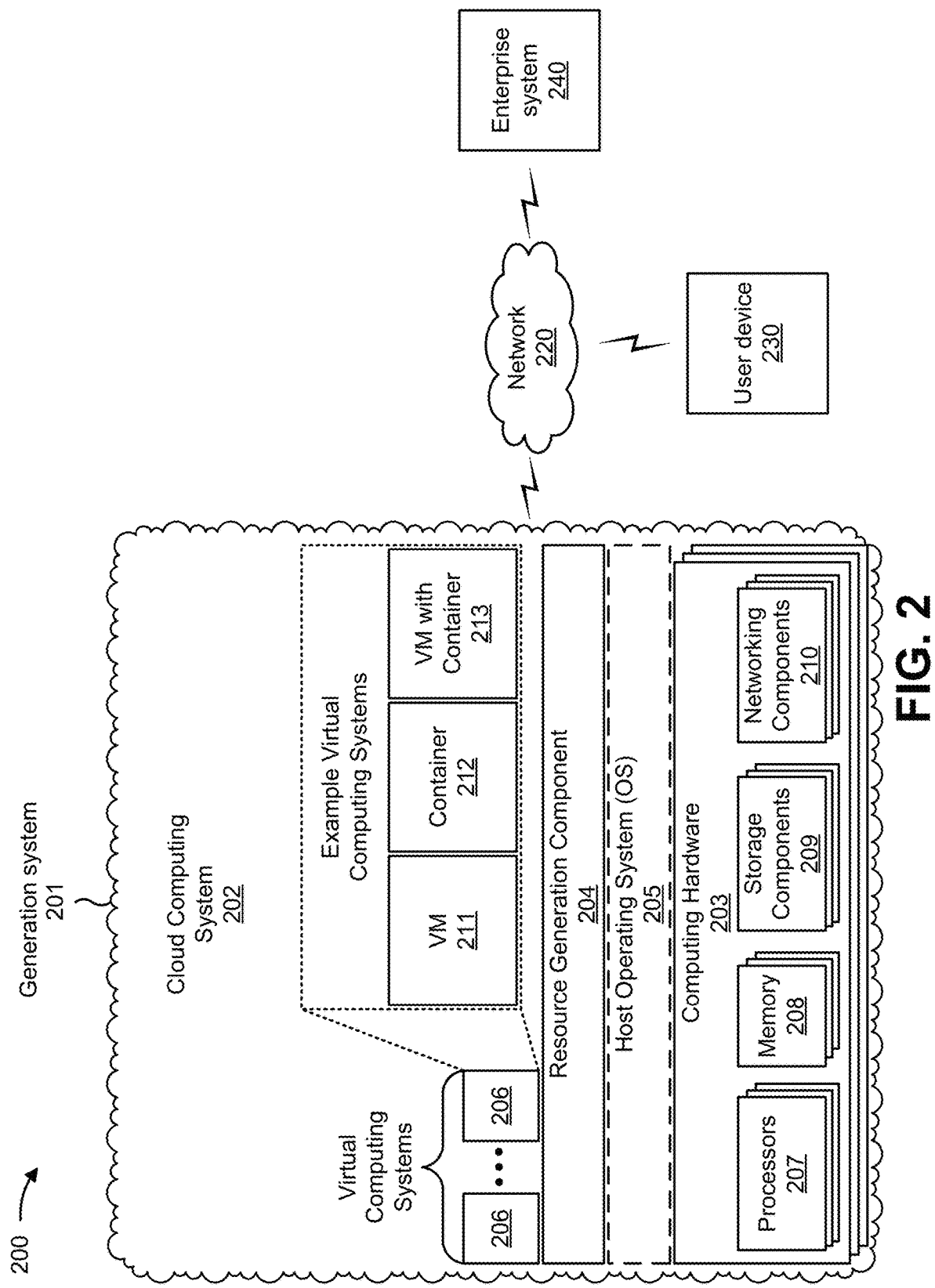
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a generation system 201, which may include one or more elements of and/or may execute within a cloud computing system 202. The cloud computing system 202 may include one or more elements 203-213, as described in more detail below. As further shown in FIG. 2, environment 200 may include a network 220, a user device 230, and/or an enterprise system 240. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the generation system 201 may include one or more elements 203-213 of the cloud computing system 202, may execute within the cloud computing system 202, and/or may be hosted within the cloud computing system 202, in some implementations, the generation system 201 may not be cloud-based (e.g., may be implemented outside of a cloud computing system) or may be partially cloud-based. For example, the generation system 201 may include one or more devices that are not part of the cloud computing system 202, such as device 300 of FIG. 3, which may include a standalone server or another type of computing device. The generation system 201 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or the like, and/or a combination of these or other types of networks. The network 220 enables communication among the devices of environment 200.

User device 230 includes one or more devices capable of receiving, generating, storing, processing, and/or providing information, as described elsewhere herein. User device 230 may include a communication device and/or a computing device. For example, user device 230 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. User device 230 may communicate with one or more other devices of environment 200, as described elsewhere herein.

Enterprise system 240 includes one or more devices capable of receiving, generating, storing, processing, providing, and/or routing information, as described elsewhere herein. Enterprise system 240 may include a communication device and/or a computing device. For example, enterprise system 240 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. Enterprise system 240 may communicate with one or more other devices of environment 200, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
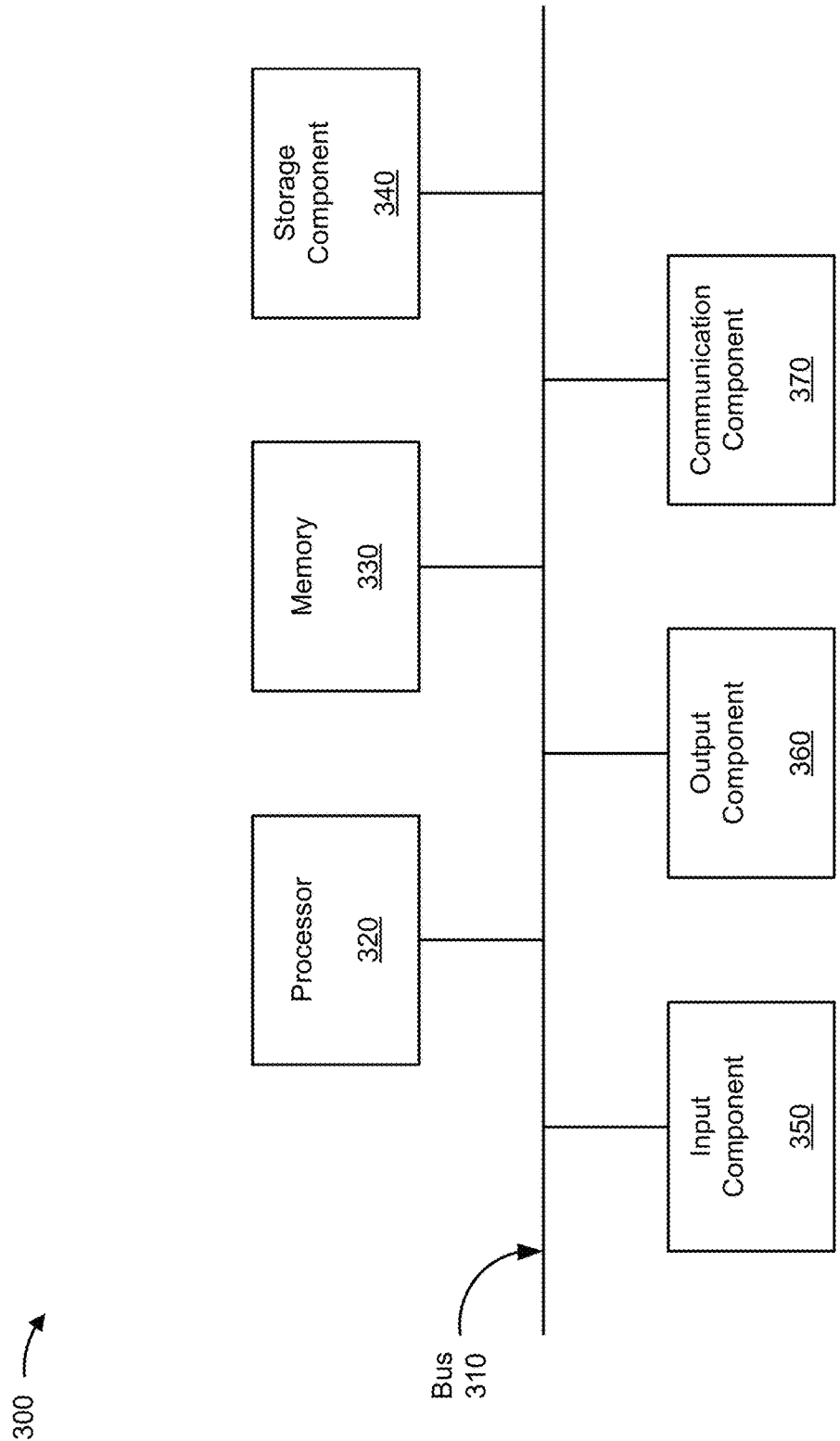
FIG. 3 is a diagram of example components of one or more devices of FIG. 2.

FIG. 3 is a diagram of example components of a device 300, which may correspond to generation system 201, user device 230, and/or enterprise system 240. In some implementations, generation system 201, user device 230, and/or enterprise system 240 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
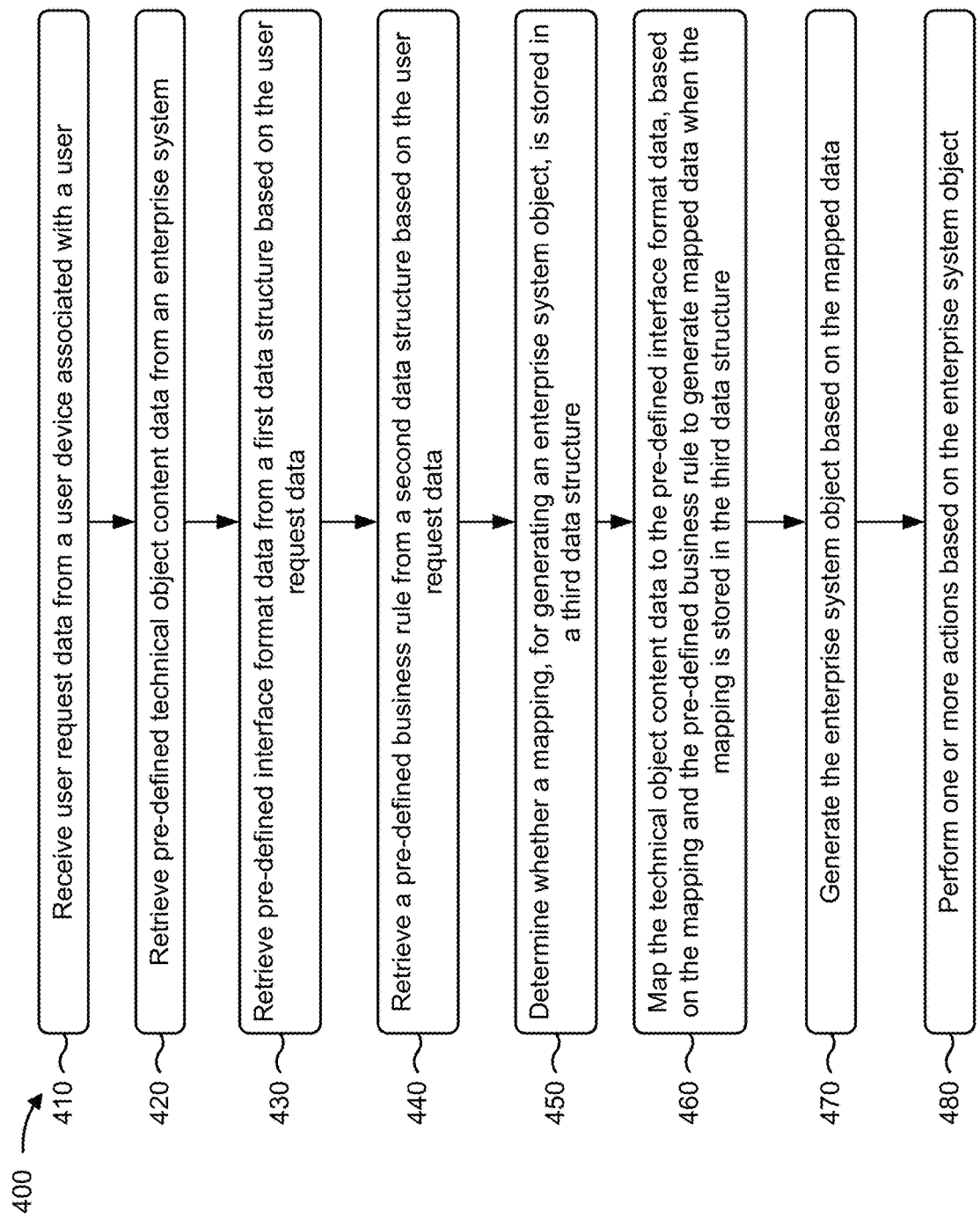
FIG. 4 is a flowchart of an example process for generating WRICEF objects for enterprise software.

FIG. 4 is a flowchart of an example process 400 for generating WRICEF objects for enterprise software. In some implementations, one or more process blocks of FIG. 4 may be performed by a device (e.g., generation system 201). In some implementations, one or more process blocks of FIG. 4 may be performed by another device or a group of devices separate from or including the device, such as a user device (e.g., user device 230) and/or an enterprise system (e.g., enterprise system 240). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving user request data from a user device associated with a user (block 410). For example, the device may receive user request data from a user device associated with a user, as described above. The user request data may include a recording of activities performed by the user with the user device.

As further shown in FIG. 4, process 400 may include retrieving pre-defined technical object content data from an enterprise system (block 420). For example, the device may retrieve pre-defined technical object content data from an enterprise system based on the user request data, as described above.

As further shown in FIG. 4, process 400 may include retrieving pre-defined interface format data from a first data structure based on the user request data (block 430). For example, the device may retrieve pre-defined interface format data from a first data structure based on the user request data, as described above.

As further shown in FIG. 4, process 400 may include retrieving a pre-defined business rule from a second data structure based on the user request data (block 440). For example, the device may retrieve a pre-defined business rule from a second data structure based on the user request data, as described above.

As further shown in FIG. 4, process 400 may include determining whether a mapping, for generating an enterprise system object, is stored in a third data structure (block 450). For example, the device may determine whether a mapping, for generating an enterprise system object, in a third data structure, as described above.

In some implementations, the enterprise system object may include a WRICEF object. Alternatively, and/or additionally, the enterprise system object may include a custom enhancement for enterprise software, and configuration units that group configuration data, development data, and documentation associated with the custom enhancement. Alternatively, and/or additionally, the enterprise system object may include one or more of a report for enterprise software, an outbound user interface for the enterprise software, an inbound user interface for the enterprise software, a conversion user interface for the enterprise software, an enhancement to a standard user interface for the enterprise software, an enhancement to a new user interface application for the enterprise software, a business intelligence transformation process for the enterprise software, a form for the enterprise software, or a workflow for the enterprise software.

As further shown in FIG. 4, process 400 may include mapping the technical object content data to the pre-defined interface format data, based on the mapping and the pre-defined business rule to generate mapped data when the mapping is stored in the third data structure (block 460). For example, the device may map the technical object content data to the pre-defined interface format data, based on the mapping and the pre-defined business rule to generate mapped data when the mapping is stored in the third data structure, as described above.

As further shown in FIG. 4, process 400 may include generating the enterprise system object based on the mapped data when the mapping, for generating the enterprise system object, exists in the mapped data (block 470). For example, the device may generate the enterprise system object based on the mapped data, as described above. In some implementations, the device may utilize a wireframe tool to generate the enterprise system object.

In some implementations, the device may receive creation data from the user device when the mapping, for generating the enterprise system object, is not stored in the third data structure. The device may generate the enterprise system object based on the creation data.

As further shown in FIG. 4, process 400 may include performing one or more actions based on the enterprise system object (block 480). For example, the device may perform one or more actions based on the enterprise system object, as described above. In some implementations, performing the one or more actions may comprise one or more of generating a document based on the enterprise system object and providing the document to the user device, generating code based on the enterprise system object and providing the code to the user device, or providing the enterprise system object to the user device or the enterprise system.

Alternatively, and/or additionally, performing the one or more actions may comprise one or more of causing the user device to implement the enterprise system object in enterprise software, causing the enterprise system to implement the enterprise system object in enterprise software, or providing the enterprise system object to one or more other user devices associated with the enterprise system. In some implementations, performing the one or more actions may comprise continuously testing the enterprise system object.

In some implementations, the device may generate code based on the enterprise system object. The device may generate a technical document based on the enterprise system object. The technical document may be associated with the code. The generation system may cause the user device and/or the enterprise system to implement the code in enterprise software based on the technical document.

In some implementations, the device may provide the mapped data, for display, to the user device. The device may receive, from the user device, an edit to the mapped data. The device may update the mapped data based on the edit to the mapped data.

In some implementations, the device may receive, from the user device, a modification to the enterprise system object. The device may generate a modified enterprise system object based on the modification. The device may cause the user device and/or the enterprise system to implement the modified enterprise system object in enterprise software.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, user request data from a user device associated with a user, wherein the user request data includes information associated with generating an enterprise system object based on an order in which a series of actions are performed with a field,
      wherein the enterprise system object includes a workflow, report, interface, conversion, enhancement, and forms (WRICEF) object;
   retrieving, by the device, pre-defined technical object content data from an enterprise system based on the user request data;
   retrieving, by the device, pre-defined interface format data from a first data structure based on the user request data;
   retrieving, by the device, a pre-defined business rule associated with converting data stored in the field associated with the enterprise system object from a second data structure based on the user request data;
   determining, by the device, whether a mapping, for generating the enterprise system object, is stored in a third data structure;
   mapping, by the device, the pre-defined technical object content data to the pre-defined interface format data, based on the mapping and the pre-defined business rule, to generate mapped data when the mapping, for generating the enterprise system object, is stored in the third data structure,
      wherein the mapped data associates the field associated with the enterprise system object with the pre-defined interface format data;
   receiving, by the device, creation data from the user device when the mapping, for generating the enterprise system object, is not stored in the third data structure;
   generating, by the device, the enterprise system object based on the mapped data and the creation data; and
   performing, by the device, one or more actions based on the enterprise system object,
      wherein performing the one or more actions comprises one or more of:
         generating a document based on the enterprise system object and providing the document to the user device;
         generating code based on the enterprise system object and providing the code to the user device; or
         providing the enterprise system object to the user device or the enterprise system.

2. The method of claim 1, further comprising:
   continuously testing the enterprise system object.

3. The method of claim 1, wherein the enterprise system object
   includes: a custom enhancement for enterprise software, and
   configuration units that group configuration data, development data, and documentation associated with the custom enhancement.

4. The method of claim 1, further comprising: continuously testing the enterprise system object.

5. The method of claim 1, wherein the pre-defined technical object content data includes data associating a field business partner in a table.

6. The method of claim 1, wherein the enterprise system object includes one or more of: a report for enterprise software, an outbound user interface for the enterprise software, an inbound user interface for the enterprise software, a conversion user interface for the enterprise software, an enhancement to a standard user interface for the enterprise software, an enhancement to a new user interface application for the enterprise software, a business intelligence transformation process for the enterprise software, a form for the enterprise software, or a workflow for the enterprise software.

7. The method of claim 1, further comprising:
   generating a technical document based on the enterprise system object, wherein the technical document is associated with the code.

8. A device, comprising: one or more memories; and one or more processors, communicatively coupled to the one or more memories, configured to:
   receive user request data from a user device associated with a user,
      wherein the user request data includes information associated with generating an enterprise system object based on an order in which a series of actions are performed with a field;
      wherein the enterprise system object includes a workflow, report, interface, conversion, enhancement, and forms (WRICEF) object;
   receive pre-defined technical object content data from an enterprise system;
   retrieve pre-defined interface format data from a first data structure based on the user request data;

retrieve a pre-defined business rule from a second data structure based on the user request data associated with converting data stored in the field associated with the enterprise system object;
determine whether a mapping, for generating the enterprise system object, is stored in a third data structure;
receive creation data from the user device when the mapping, for generating the enterprise system object, is not stored in the third data structure;
generate the enterprise system object based on creation data received from the user device when the mapping, for generating the enterprise system object, is not stored in the third data structure; and perform one or more actions based on the enterprise system object,
wherein performing the one or more actions comprises one or more of:
generating a document based on the enterprise system object and providing the document to the user device;
generating code based on the enterprise system object and providing the code to the user device; or
providing the enterprise system object to the user device or the enterprise system.

9. The device of claim 8, wherein the one or more processors are further configured to:
receive, from the user device, a modification to the enterprise system object;
generate a modified enterprise system object based on the modification; and cause the user device or the enterprise system to implement the modified enterprise system object in enterprise software.

10. The device of claim 8, wherein the enterprise system object includes one or more of: a report for enterprise software, an outbound user interface for the enterprise software, an inbound user interface for the enterprise software, a conversion user interface for the enterprise software, an enhancement to a standard user interface for the enterprise software, an enhancement to a new user interface application for the enterprise software, a business intelligence transformation process for the enterprise software, a form for the enterprise software, or a workflow for the enterprise software.

11. The device of claim 8, wherein the one or more processors are further configured to: provide mapped data, for display, to the user device; receive, from the user device, an edit to the mapped data; and update the mapped data based on the edit to the mapped data.

12. The device of claim 8, wherein the one or more processors, when generating the enterprise system object based on mapped data, are configured to: utilize a wireframe tool to generate the enterprise system object.

13. The device of claim 8, wherein the one or more processors, when performing the one or more actions, are configured to: generate the code based on the enterprise system object; generate a technical document based on the enterprise system object, wherein the technical document is associated with the code; and cause the user device or the enterprise system to implement the code in enterprise software based on the technical document.

14. The device of claim 8, wherein the user request data includes a recording of activities performed by the user with the user device.

15. A non-transitory computer-readable medium storing a set of instructions, the set of instructions comprising:
one or more instructions that, when executed by one or more processors of a device, cause the device to:
receive user request data from a user device associated with a user,
wherein the user request data includes information associated with generating an enterprise system object based on an order in which a series of actions are performed with a field,
wherein the enterprise system object includes a workflow, report, interface, conversion, enhancement, and forms (WRICEF) object;
receive pre-defined technical object content data from an enterprise system;
retrieve pre-defined interface format data from a first data structure based on the user request data;
retrieve a pre-defined business rule from a second data structure based on the user request data associated with converting data stored in the field associated with the enterprise system object;
determine whether a mapping, for generating the enterprise system object, is stored in a third data structure;
map the pre-defined technical object content data to the pre-defined interface format data, based on the mapping and the pre-defined business rule,
to generate mapped data when the mapping is stored in the third data structure;
receive creation data from the user device when the mapping is not stored in the third data structure;
generate the enterprise system object based on the creation data; and
perform one or more actions based on the enterprise system object,
wherein the one or more instructions, that cause the one or more processors to perform the one or more actions cause the one or more processors to:
generating a document based on the enterprise system object and providing the document to the user device;
generating code based on the enterprise system object and providing the code to the user device; or
providing the enterprise system object to the user device or the enterprise system.

16. The non-transitory computer-readable medium of claim 15, wherein the one or more instructions further cause the device to: generate the enterprise system object based on the mapped data when the mapping, for generating the enterprise system object, exists in the mapped data.

17. The non-transitory computer-readable medium of claim 15, wherein the one or more instructions, that cause the device to perform the one or more actions, cause the device to one or more of: cause the user device to implement the enterprise system object in enterprise software; cause the enterprise system to implement the enterprise system object in enterprise software; or provide the enterprise system object to one or more other user devices associated with the enterprise system.

18. The non-transitory computer-readable medium of claim 15, wherein the enterprise system object includes: a custom enhancement for enterprise software, and configuration units that group configuration data, development data, and documentation associated with the custom enhancement.

19. The non-transitory computer-readable medium of claim 15, wherein the one or more instructions further cause the device to: provide the mapped data, for display, to the user device; receive, from the user device, an edit to the mapped data; and update the mapped data based on the edit to the mapped data.

20. The non-transitory computer-readable medium of claim 15, wherein the one or more instructions, that cause the device to perform the one or more actions, cause the device to: generate code based on the enterprise system object; generate a technical document based on the enterprise system object, wherein the technical document is associated with the code; and cause the user device or the enterprise system to implement the code in enterprise software based on the technical document.

* * * * *

UNITED STATES PATENT AND TRADEMARK OFFICE
CERTIFICATE OF CORRECTION

Page 1 of 1

PATENT NO. : 11,640,414 B2
APPLICATION NO. : 17/103164
DATED : May 2, 2023
INVENTOR(S) : Michel-Etienne Liegard et al.

It is certified that error appears in the above-identified patent and that said Letters Patent is hereby corrected as shown below:

In the Claims

Claim 2:
Column 14, Lines 21-22, change "The method of claim 1, further comprising: continuously testing the enterprise system object." to --The method of claim 1, wherein performing the one or more actions comprises one or more of: causing the user device to implement the enterprise system object in enterprise software; causing the enterprise system to implement the enterprise system object in enterprise software; or providing the enterprise system object to one or more other user devices associated with the enterprise system.--

Claim 20:
Column 17, Line 4, change "device to: generate code based on the enterprise system" to --device to: generate the code based on the enterprise system--

Signed and Sealed this
Fourth Day of July, 2023

Katherine Kelly Vidal
*Director of the United States Patent and Trademark Office*